United States Patent
Wang et al.

(10) Patent No.: US 9,703,428 B2
(45) Date of Patent: Jul. 11, 2017

(54) TOUCH PANEL AND TOUCH DETECTING METHOD THEREFOR

(71) Applicants: Shanghai AVIC Optoelectronics Co., Ltd., Shanghai (CN); Tianma Micro-Electronics Co., Ltd., Shenzhen (CN)

(72) Inventors: Xiangchun Wang, Shanghai (CN); Xupeng Wang, Shanghai (CN); Jie Cheng, Shanghai (CN)

(73) Assignees: SHANGHAI AVIC OPTOELECTRONICS CO., LTD., Shanghai (CN); TIANMA MICRO-ELECTRONICS CO., LTD., Shenzhen (CN)

(*) Notice: Subject to any disclaimer, the term of this patent is extended or adjusted under 35 U.S.C. 154(b) by 245 days.

(21) Appl. No.: 14/272,430

(22) Filed: May 7, 2014

(65) Prior Publication Data

US 2015/0212616 A1   Jul. 30, 2015

(30) Foreign Application Priority Data

Jan. 27, 2014   (CN) .......................... 2014 1 0040117

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ......... G06F 3/041; G06F 3/0416; G06F 3/044

(Continued)

(56) References Cited

U.S. PATENT DOCUMENTS

| 8,743,085 B2 * | 6/2014 | Liu | G06F 3/044 178/18.01 |
| 2009/0273579 A1 * | 11/2009 | Zachut | G06F 3/044 345/174 |

(Continued)

FOREIGN PATENT DOCUMENTS

| CN | 103207718 A | 7/2013 |
| EP | 2120341 A2 | 11/2009 |

*Primary Examiner* — Amare Mengistu
*Assistant Examiner* — Stacy Khoo
(74) *Attorney, Agent, or Firm* — Alston & Bird LLP

(57) ABSTRACT

The present invention discloses a touch panel having a multitude of driving and sensing electrodes and a touch detecting method therefor. The method includes: driving each driving electrode, and detecting a change in coupling capacitance between each driving electrode and each sensing electrode to determine at least one sensing electrode corresponding to a touch position; multiplexing each one of the at least one sensing electrode corresponding to the touch position to be a generated driving electrode, and multiplexing each driving electrode to be a generated sensing electrode; driving the generated driving electrode, and detecting a change in coupling capacitance between the generated driving electrode and each generated sensing electrode to determine at least one driving electrode corresponding to the touch position; driving each driving electrode corresponding to the touch position, and detecting a change in coupling capacitance between each driving electrode and each sensing electrode corresponding to the touch position to determine the touch position.

12 Claims, 5 Drawing Sheets

(58) Field of Classification Search
USPC .................... 345/173–178; 178/18.01–18.09
See application file for complete search history.

(56) References Cited

U.S. PATENT DOCUMENTS

2011/0037708 A1* 2/2011 Yang ..................... G06F 3/044
                                                                  345/173
2011/0298745 A1* 12/2011 Souchkov ............... G06F 3/044
                                                                 345/174

* cited by examiner

TOUCH PANEL AND TOUCH DETECTING METHOD THEREFOR

CROSS-REFERENCES TO RELATED APPLICATIONS

This application claims the benefit of priority to Chinese Patent Application No. 201410040117.2, filed with the Chinese Patent Office on Jan. 27, 2014 and entitled "TOUCH PANEL AND TOUCH DETECTING METHOD THEREFOR", the content of which is incorporated herein by reference in its entirety.

TECHNICAL FIELD

The present application relates to the semiconductor technology field, in particular to a touch panel and a touch detecting method for the touch panel.

BACKGROUND OF THE INVENTION

A touch panel is a touch-sensitive input device. When a user's finger clicks on a graphic button displayed on a touch display device provided with the touch panel, a touch feedback system of the touch panel drives various connected means according to pre-programmed functions, and the display device provided with the touch panel achieves a vivid video effect by means of displayed pictures. So far, the touch panel is a latest input device and represents the simplest, most convenient and natural human-machine interface device.

A touch panel locates a touch point by using an absolute coordinate system, which is featured in that each position coordinate is independent of the preceding position coordinate, thus enabling a user to click any desired position directly. Thus, the touch panel differs from a locating system (such as a mouse) based on a relative coordinate system.

Presently, there are capacitive touch panels and resistive touch panels. Generally, the capacitive touch panel includes a composite glass panel with four layers, where at least one layer of Indium Tin Oxide (ITO) is disposed in the composite glass panel, and the outmost layer of the compound glass panel is a thin Silica glass protective layer. The ITO coating layer is a working layer where a touch electrode layer of the capacitive touch panel is formed. When a user's finger touches the capacitive touch panel, a coupling capacitance is formed between the user and the surface of the capacitive touch panel due to a human body electric field, so that a sensing current flowing through sensing electrodes in the touch electrode layer is changed, and a position of a touch point may be determined from the change of the sensing current, i.e. by comparing magnitudes of the sensing currents.

BRIEF SUMMARY OF THE INVENTION

An embodiment of the present disclosure provides a touch detecting method for a touch panel. The touch panel includes a plurality of driving electrodes and a plurality of sensing electrodes. The touch detecting method includes: driving each of the driving electrodes, and detecting a change in coupling capacitance between each of the driving electrodes and each of the sensing electrodes to determine at least one sensing electrode corresponding to a touch position; multiplexing each of the at least one sensing electrode corresponding to the touch position to be at least one generated driving electrode, and multiplexing each of the driving electrodes to be a generated sensing electrodes; driving each of the at least one generated driving electrode (i.e. the at least one multiplexed sensing electrode), and detecting a change in coupling capacitance between the generated sensing electrode (i.e. the multiplexed driving electrodes) and each of the at least one generated driving electrode to determine at least one driving electrode corresponding to the touch position; driving the at least one driving electrode corresponding to the touch position, and detecting a change in coupling capacitance between each of the at least one driving electrode corresponding to the touch position and each of the at least one sensing electrode corresponding to the touch position to determine the touch position.

An embodiment of the present disclosure provides a touch panel including a plurality of driving electrodes, a plurality of sensing electrodes, a plurality of driving lines connected with the plurality of driving electrodes, and a plurality of sensing lines connected with the plurality of sensing electrodes, where the touch panel further includes a control unit connected with all of the driving lines and all of the sensing lines; the driving lines can be configured to respectively drive the driving electrodes, and the sensing lines can be configured to respectively receive sensing signals from the sensing electrodes. The control unit is configured to: drive each of the driving electrodes, and detect a change in coupling capacitance between each of the driving electrodes and each of the sensing electrodes, to determine at least one sensing electrode corresponding to a touch position; multiplex each of the at least one sensing electrode corresponding to the touch position to be at least one generated driving electrode, and multiplex each of the driving electrodes to be a generated sensing electrode; drive each of the at least one generated driving electrode (the at least one multiplexed sensing electrode), and detect a change in coupling capacitance between each of the at least one generated driving electrode and each of the generated sensing electrodes (i.e. the multiplexed driving electrodes) to determine at least one driving electrode corresponding to the touch position; and drive the at least one driving electrode corresponding to the touching position, and detect a change in coupling capacitance between each of the at least one driving electrode corresponding to the touch position and each of the at least one sensing electrode corresponding to the touch position to determine the touch position.

BRIEF DESCRIPTION OF THE DRAWINGS

In order to more clearly illustrate technical solutions of embodiments of the present disclosure or the prior art, the accompanying drawings used for the description of the embodiments or the prior art are briefly introduced below. Obviously, the drawings for the following description only show some embodiments of the present disclosure, and other drawings may also be obtained from the described drawings by those skilled in the art without any creative work.

DETAILED DESCRIPTION OF THE INVENTION

Embodiments of the present disclosure are described below in combination with the accompanying drawings. It is understood that the disclosure is illustrative only, and changes may be made in matters of shape, size and arrangement of the components. All other embodiments obtained in light of the described embodiments of the present disclosure by those skilled in the art should fall within the protection scope of the present disclosure.

Currently, to determine a position of a touch point on a capacitive touch screen, driving signals are respectively sent to all driving electrodes sequentially, and all sensing lines continuously receive sensing signals via sensing electrodes. In determining a position of the touch point, since a large number of driving electrodes are driven, it takes considerable time to process a large amount of data for the determination of a position of the touch point, so that the efficiency of determining a touch point position is very low.

In view of the above problems, embodiments of the present disclosure provides a touch panel and a touch detecting method for the touch panel, to solve the technical problem that the efficiency of positioning a touch point is low because of a large amount of data to be processed in positioning the touch point.

Figure 1:
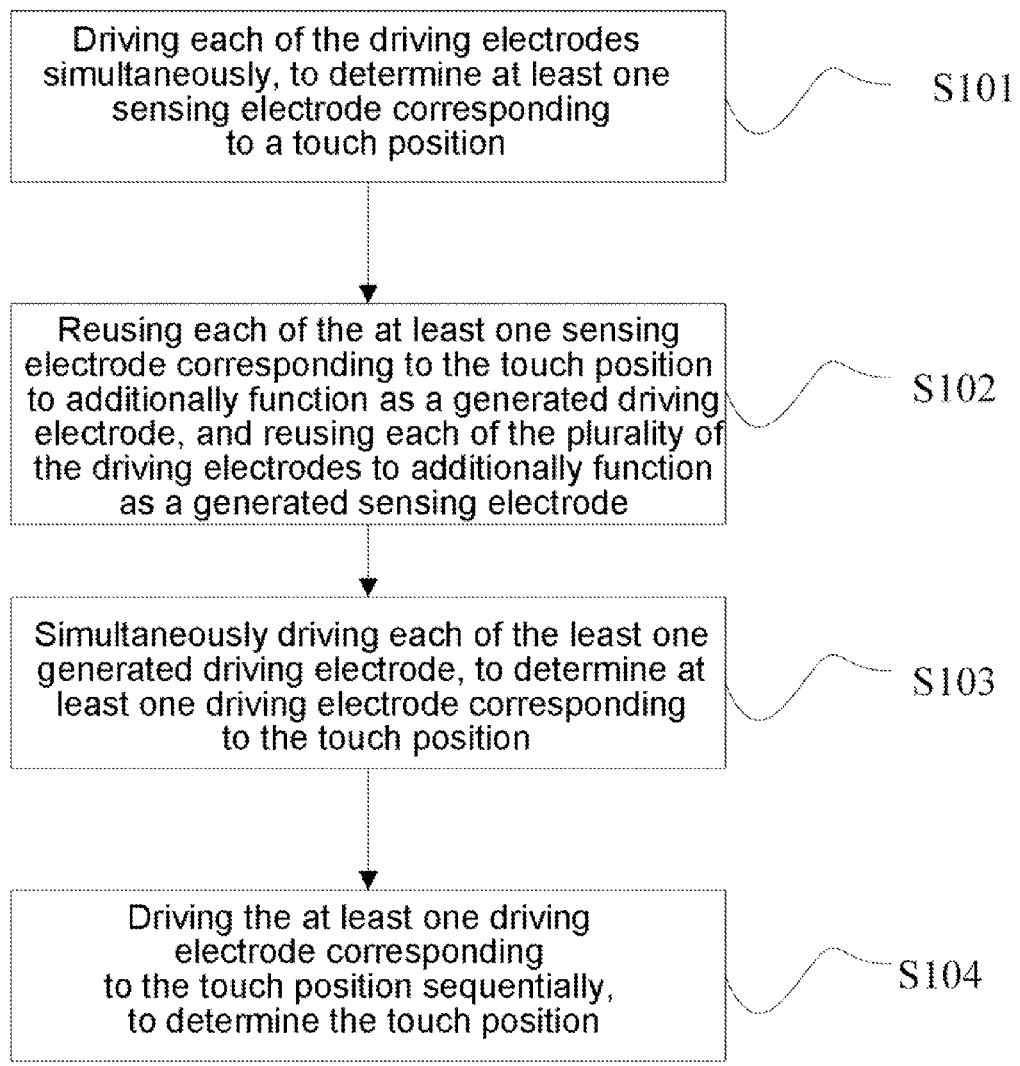
FIG. 1 is a flow chart showing a touch detecting method for a touch panel according to an embodiment of the present disclosure.

FIG. 1 is a flow chart of a touch detection method for a touch panel according to an embodiment of the disclosure.

An embodiment of the present disclosure discloses a touch detecting method for a touch panel, and the touch panel includes a plurality of driving electrodes and a plurality of sensing electrodes, where the driving electrodes or sensing electrodes can be formed by the ITO, for example. As shown in FIG. 1, the touch detecting method includes the following Steps S101 to S104:

Step S101: driving each of the driving electrodes, and detecting a change in a coupling capacitance between each of the driving electrodes and each of the sensing electrodes, to determine at least one sensing electrode corresponding to a touch position.

Specifically, in Step S101, each of the driving electrodes is driven, and a change in the coupling capacitance between each of the driving electrode and each of the sensing electrodes is detected. Preferably, all of the driving electrodes are driven simultaneously within a certain time period, or all of driving electrodes within a selected range are driven simultaneously as desired, and a change in the coupling capacitance between each of the driving electrodes and each of the sensing electrodes is detected. For purposes of illustration, the description below is made by an example in which all of the driving electrodes are driven simultaneously and a change in the coupling capacitance between each of the driving electrodes and each of the sensing electrodes is detected.

The change in the coupling capacitance is compared with a predetermined threshold value. If the change in the coupling capacitance is greater than or equal to the predetermined threshold value, it is determined that the touch panel is touched, and if the change in the coupling capacitance is smaller than the predetermined threshold value, it is determined that the touch panel is not touched. The threshold value herein may be determined as actually desired and is not limited herein, so are the selected threshold values mentioned hereafter. At least one sensing electrode corresponding to the touch position is determined according to the variations of the coupling capacitances.

Step S102: reusing (i.e., multiplexing) each of the at least one sensing electrode corresponding to the touch position to additionally function as at least one driving electrode, and reusing (multiplexing) each of the plurality of the driving electrodes to additionally function as sensing electrodes.

In Step S102, any touched sensing electrodes are determined according to the detected variations of the coupling capacitances, thereby determining the at least one sensing electrode corresponding to the touch position. Then these sensing electrodes corresponding to the touch position additionally function as driving electrodes, which are configured to subsequently send a driving signal to each of the plurality of driving electrodes of the touch panel, at this point, each of the plurality of driving electrodes of the touch panel additionally functions as a sensing electrode.

Figure 2A:
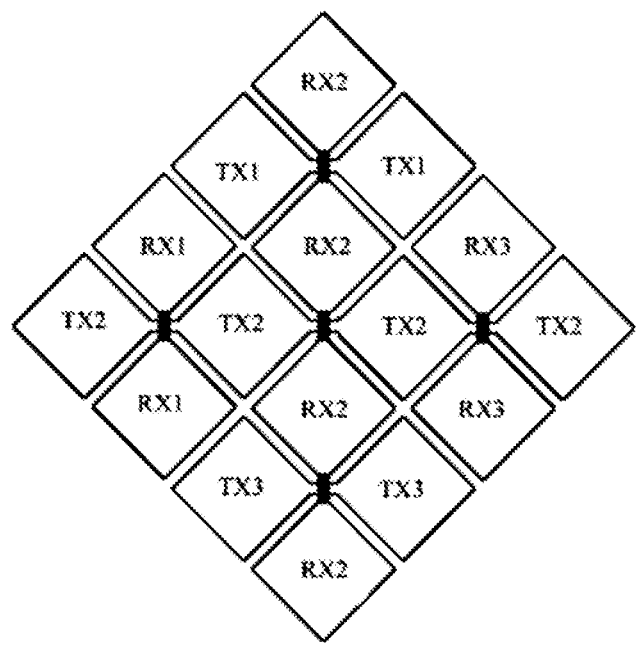
FIG. 2A is a schematic diagram showing sensing electrodes and driving electrodes, before each of the driving electrodes additionally functions as a sensing electrode, and at least one sensing electrode corresponding to a touch position additionally function as at least one driving electrode, according to an embodiment of the present disclosure.

The description below is made with reference to FIG. 2A and FIG. 2B. FIG. 2A is a schematic diagram showing sensing electrodes and driving electrodes, before each of the at least one sensing electrode corresponding to a touch position additionally functions as a driving electrode, and the plurality of driving electrodes additionally function as sensing electrodes, where TX1, TX2 and TX3 denote driving electrodes, and RX1, RX2, and RX3 denote sensing electrodes. When the driving electrodes TX1, TX2 and TX3 are driven simultaneously, if it is detected that changes of the coupling capacitances between the sensing electrodes RX1, RX2 and their adjacent driving electrodes TX1, TX2, and TX3 are greater than the predetermined threshold value, then the sensing electrodes RX1 and RX2 are determined as sensing electrodes corresponding to the touch position.

Figure 2B:
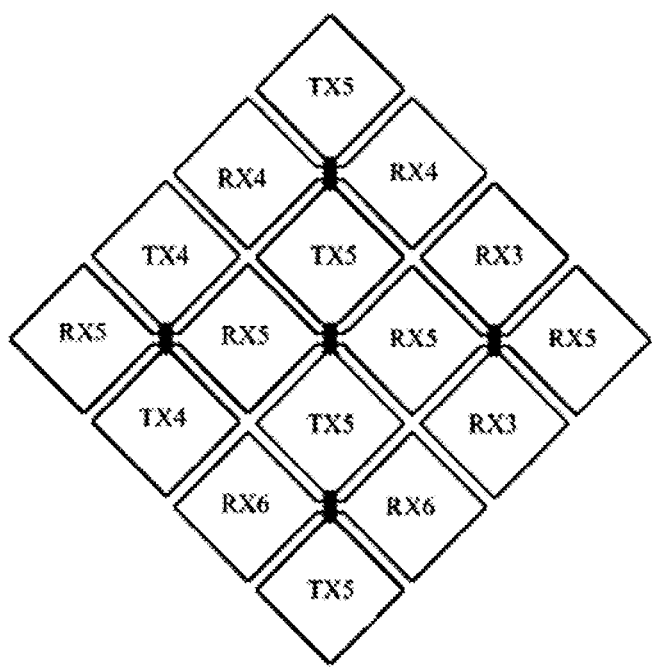
FIG. 2B is a schematic diagram showing the sensing electrodes and the driving electrodes, after each of the driving electrodes additionally functions as a sensing electrode, and the least one sensing electrode corresponding to the touch position additionally function as the at least one driving electrode, as disclosed by an embodiment of the present disclosure.

FIG. 2B is a schematic diagram showing the sensing electrodes and the driving electrodes, after each of the at least one sensing electrode corresponding to the touch position additionally functions as a driving electrode, and the plurality of driving electrodes additionally function as sensing electrodes, where the sensing electrodes corresponding to the touch position additionally function as driving electrodes TX4 and TX5. In other words, the sensing electrodes RX1 and RX2 corresponding to the touch position additionally function as generated driving electrodes TX4 and TX5. RX3 represents a sensing electrode which does not additionally function as a driving electrode, and the driving electrodes of the touch panel (e.g. the driving electrodes TX1, TX2 and TX3) additionally function as generated sensing electrodes RX4, RX5 and RX6.

It should be noted that, for ease of describing the touch detecting method in the present embodiment, FIG. 2A and FIG. 2B illustrate specifically the method shown in FIG. 1 but do not unduly limit the touch detecting method for the touch panel disclosed by the present embodiment, in other words, the method disclosed by this embodiment not only can be applied to the structures shown in FIG. 2A and FIG. 2B, but also to any other structures formed by driving electrodes and sensing electrodes, as understood by those skilled in the art.

Step S103: driving each of the at least one generated driving electrodes (i.e. the at least one reused/multiplexed sensing electrode), and detecting a change in coupling capacitance between each of the at least one generated driving electrodes and each of the generated sensing electrodes (i.e. the reused/multiplexed driving electrodes), to determine at least one driving electrode corresponding to the touch position. Preferably, within a specific time period or a selected range, the at least one generated driving electrode is driven simultaneously, the change in coupling capacitance between each of the at least one generated driving electrode and each of the generated sensing electrodes is detected, and at least one driving electrode corresponding to the touch position is determined. Likewise, in order for clear illustration, the description below is made by an example in which the at least one sensing electrode which is reused (multiplexed) and additionally function as at least one driving electrode is/are driven simultaneously, but the present disclosure is not limited thereto.

Specifically, in Step S103, the at least one sensing electrodes which additionally function as the generated driving electrodes TX4 and TX5 are driven simultaneously, and a change in a coupling capacitance between each of the driving electrodes which additionally function as the generated sensing electrodes RX4, RX5 and RX6 and each of the at least one sensing electrodes which additionally function as the generated driving electrodes TX4 and TX5 is detected.

The change in the coupling capacitance is compared with the predetermined threshold value of coupling capacitance variation, and if the change in the coupling capacitance is greater than or equal to the predetermined threshold value of coupling capacitance variation, it is determined that the touch panel is touched; and if the change in the coupling capacitance is smaller than the predetermined threshold value of coupling capacitance variation, it is determined that the touch panel is not touched.

At least one driving electrode corresponding to the touch position is determined according to the variations of the coupling capacitances. Assume the touch panel is touched in an embodiment, if it is detected that the variations of the coupling capacitances between the generated sensing electrodes RX4, RX5 and the generated driving electrodes TX4, TX5 are greater than the predetermined threshold value of coupling capacitance variation, then the generated sensing electrodes RX4 and RX5 are determined as driving electrodes corresponding to the touch position, in other words, the driving electrodes TX1 and TX2 in FIG. 2A are driving electrodes corresponding to the touch position.

Step S104: driving the at least one driving electrode corresponding to the touching position, and detecting variations of coupling capacitances between the at least one driving electrode corresponding to the touch position and the at least one sensing electrode corresponding to the touch position, to determine the touch position. Preferably, the at least one driving electrode corresponding to the touch position is/are driven sequentially, and the variations of coupling capacitances between the at least one driving electrode corresponding to the touch position and the at least one sensing electrode corresponding to the touch position is/are detected, to determine the touch position.

Specifically, in Step S104, the driving electrodes TX1 and TX2 corresponding to the touch position are driven sequentially, and the variations of coupling capacitances between the driving electrodes TX1, TX2 corresponding to the touch position and the sensing electrodes RX1, RX2 corresponding to the touch position are detected.

The change in the coupling capacitance is compared with the predetermined threshold value of coupling capacitance variation, and if the change in the coupling capacitance is greater than or equal to the predetermined threshold value of coupling capacitance variation, it is determined that the touch panel is touched, and if the change in the coupling capacitance is smaller than the predetermined threshold value of coupling capacitance variation, it is determined that the touch panel is not touched.

The driving electrodes corresponding to the touch position and the sensing electrodes corresponding to the touch position are determined according to the variations of the coupling capacitances, to determine the position of the touch point. For example, coordinates or other standards, systems and methods (such as a data stream) for position identifying are formed by a driving electrodes corresponding to the touch position and a sensing electrodes corresponding to the touch position, to determine the position of the touch point. The step operates in a principle the same as that for detecting a touch position in the prior art, and thus will not be repeatedly described herein.

With comparison with the prior art where all driving electrodes are driven and all sensing electrodes are detected to position a touch point, the touch detecting method for a touch panel provided by an embodiment of the present disclosure is advantageous, because an embodiment of the present disclosure reduces the number of the driven driving electrodes and the number of the detected sensing electrodes by means of determining the sensing electrodes corresponding to the touch position and the driving electrodes corresponding to the touch position, so that the amount of data to be processed for positioning the touch point is reduced, thereby improving the efficiency of positioning the touch point. In addition, the driving electrodes are driven sequentially in the prior art, however, in an embodiment of the present disclosure, all of the driving electrodes can be driven simultaneously, thereby shortening the time for driving the driving electrodes.

Furthermore, in the prior art, since driving lines for driving the driving electrodes and sensing lines for receiving sense signals are always in working status in positioning a touch point on the touch panel, there is interference between the driving lines and the sensing lines, thus generating significant noise.

In order to further solve the above technical problem, while performing Step S103, sensing electrodes other than those corresponding to the touch position may be grounded, in an embodiment, the sensing electrode RX3 in FIG. 2A or 2B may be grounded. By grounding the sensing electrodes other than those corresponding to the touch position, sensing lines connected with sensing electrodes other than those corresponding to the touch position stop receiving sense signals, thereby avoiding the interference between the driving lines and the corresponding sensing lines and reducing noise.

Likewise, while performing Step S104, driving electrode (such as the driving electrode TX3) other than the driving electrodes TX1 and TX2 corresponding to the touch position and sensing electrodes (such as the sensing electrode RX3) other than the sensing electrodes RX1 and RX2 corresponding to the touch position may be grounded simultaneously.

By grounding the driving electrodes other than those corresponding to the touch position and the sensing electrodes other than those corresponding to the touch position, driving lines connected with the driving electrodes other than those corresponding to the touch position stop sending driving signals to the driving electrodes other than those corresponding to the touch position, and sensing lines connected with the sensing electrodes other than those corresponding to the touch position stop receiving sense signals from the sensing electrodes other than those corresponding to the touch position, thereby avoiding the interference between the corresponding driving lines and the sensing lines and reducing noise.

Figure 3:
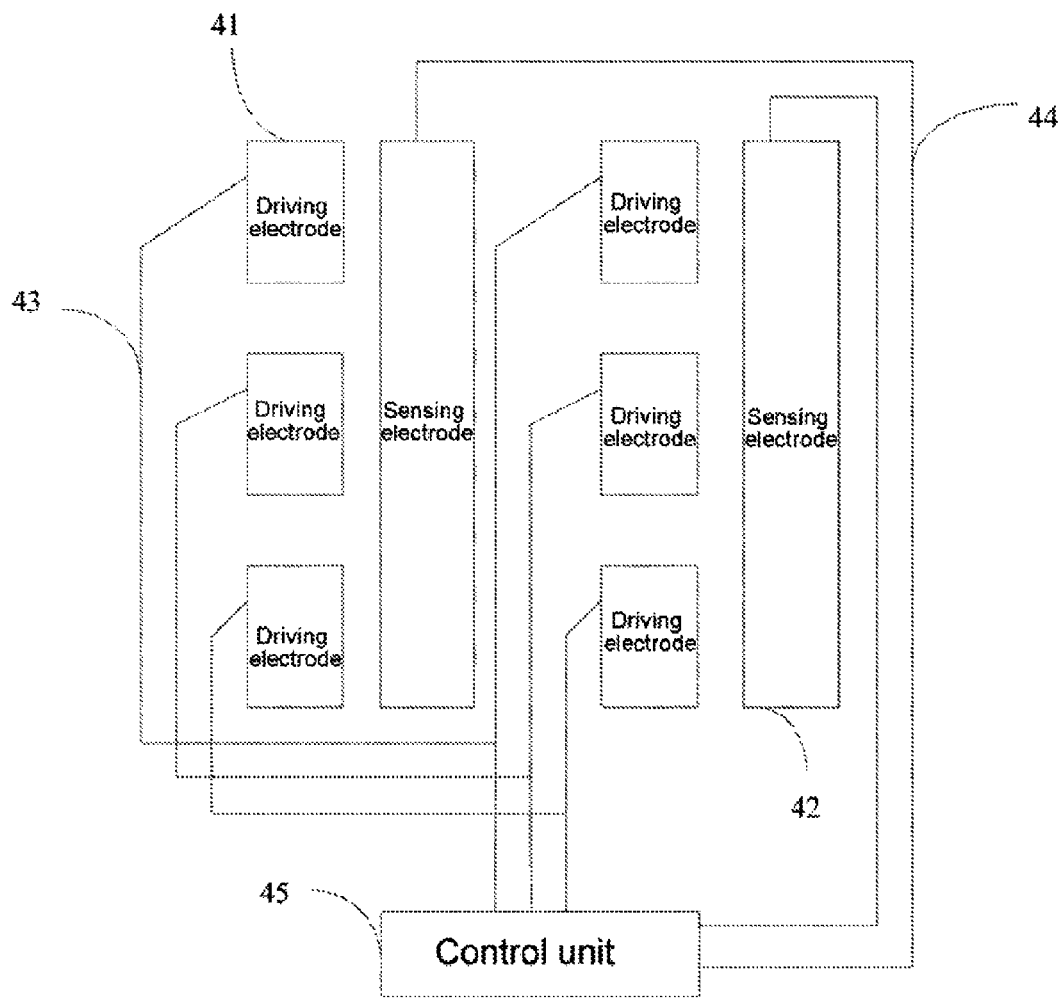
FIG. 3 is a block diagram showing the structure of a touch panel according to an embodiment of the present disclosure.

FIG. 3 is a block diagram of an exemplary structure of a touch panel according to an embodiment of the present disclosure.

As shown FIG. 3, the touch panel includes a plurality of driving electrodes 41, a plurality of sensing electrodes 42, driving lines 43 connected with the plurality of driving electrodes 41 and sensing lines 44 connected with the plurality of sensing electrodes 42. The touch panel further includes a control unit 45 connected with all the driving lines 43 and all the sensing lines 44.

In an embodiment, the control unit 45 may be an integrated circuit (IC).

The driving lines may be configured to respectively drive the driving electrodes, and the sensing lines may be configured to respectively receive sense signals from the sensing electrodes.

The control unit is configured to: drive each of the driving electrodes, and detect a change in coupling capacitance between each of the driving electrodes and each of the sensing electrodes, to determine at least one sensing electrode corresponding to a touch position; reuse the at least one sensing electrode corresponding to the touch position to additionally function as at least one driving electrode, and reuse each of the driving electrodes to additionally function as sensing electrodes; drive at least one generated driving electrodes (i.e. the at least one reused/multiplexed sensing electrode), and detect a change in coupling capacitance between each of the at least one generated driving electrodes and each of the generated sensing electrodes (i.e. the reused/multiplexed driving electrodes), to determine at least one driving electrode corresponding to the touch position; and drive the driving electrodes corresponding to the touching position, and detect variations of coupling capacitances between the driving electrodes corresponding to the touch position and the sensing electrodes corresponding to the touch position, to determine the touch position.

Figure 4A:
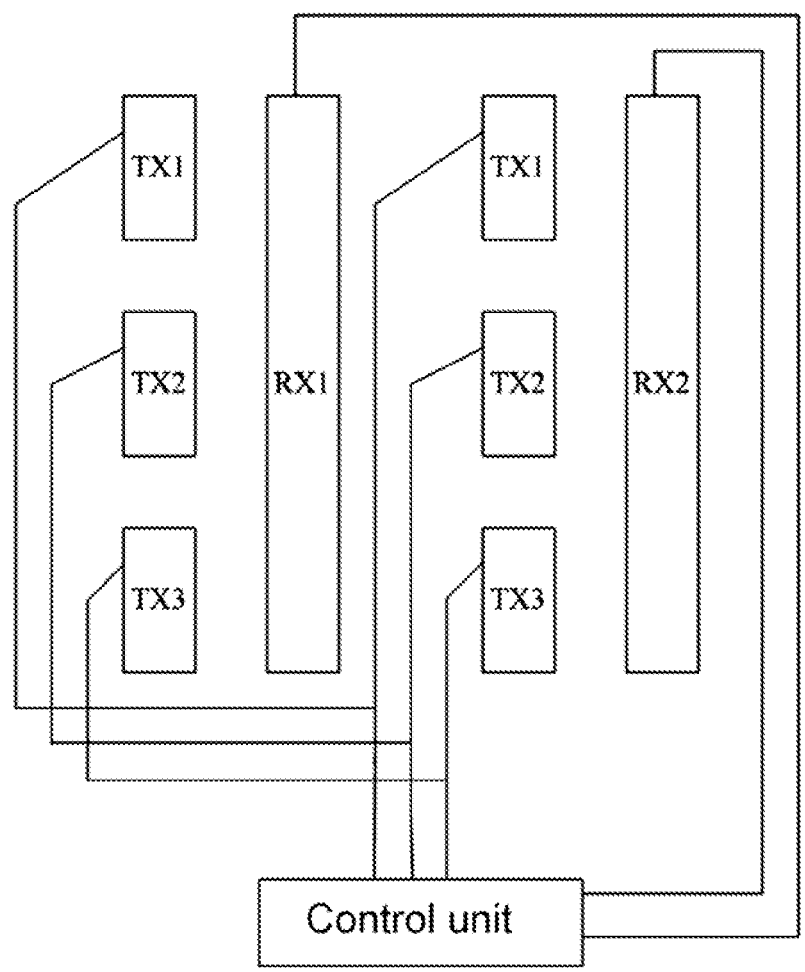
FIG. 4A is a block diagram of an exemplary structure of a touch panel, before each of at least one sensing electrodes corresponding to a touch position additionally functions as a driving electrode, and each of the driving electrodes additionally functions as a sensing electrode, according to an embodiment of the present disclosure.

The control unit and its function are described below with reference to FIG. 4A and FIG. 4B. FIG. 4A is a schematic diagram showing the structure of a touch panel, before resing each of the at least one sensing electrode corresponding to a touch position to additionally function as a driving electrode, and reusing each of the plurality of driving electrodes to additionally function as a sensing electrode, where, TX1, TX2 and TX3 represent driving electrodes, and RX1 and RX2 represent sensing electrodes. After driving, preferably simultaneously driving the driving electrodes TX1, TX2 and TX3, the control unit detects that the variations of the coupling capacitances between the sensing electrode RX1 and the driving electrodes TX1, TX2 and TX3 are greater than the predetermined threshold value of coupling capacitance variation, and then determines the sensing electrode RX1 as a sensing electrode corresponding to the touch position.

Figure 4B:
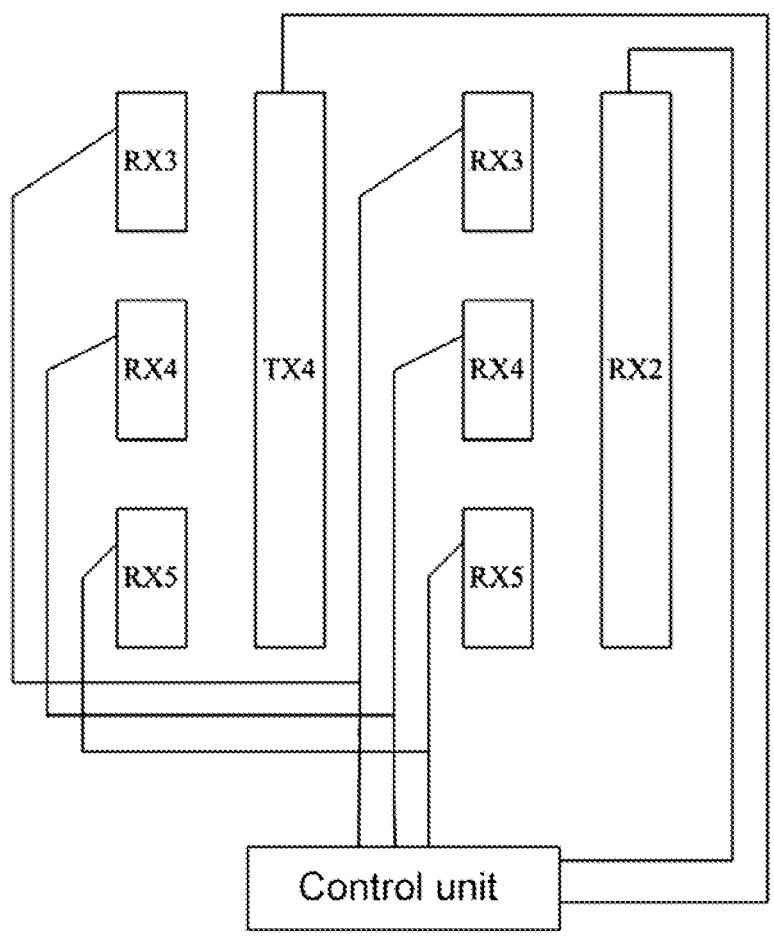
FIG. 4B is a block diagram of an exemplary structure of a touch panel, after each of the at least one sensing electrodes corresponding to a touch position additionally functions as a driving electrode, and each of the driving electrodes additionally functions as a sensing electrode, according to an embodiment of the present disclosure.

FIG. 4B is a block diagram showing the structure of the touch panel, after reusing each of the at least one sensing electrode corresponding to the touch position to additionally function as a driving electrode, and reusing each of the plurality of driving electrodes to additionally function as a sensing electrode, where, the sensing electrode corresponding to the touch position additionally functions as a generated driving electrode TX4 (the reused/multiplexed sensing electrode), the sensing electrode RX2 does not additionally function as a generated driving electrode, and reused (multiplexed) driving electrodes of the touch panel (e.g. the driving electrodes TX1, TX2 and TX3) additionally function as generated sensing electrodes RX3, RX4 and RX5.

It should be noted that, for ease of describing the touch panel in the present embodiment, FIG. 4A and FIG. 4B illustrate specifically the touch panel of FIG. 3 correspondingly, but do not unduly limit the touch panel disclosed by the present embodiment. In other words, the touch panel disclosed by the present embodiment not only may have the structure shown in FIG. 4A and FIG. 4B, but also may have the structure shown in FIG. 2A and FIG. 2B, and more generally, may have any other structure formed by driving a multitude of electrodes and sensing electrodes, as understood by those skilled in the art.

Specifically, the control unit drives, preferably simultaneously drives, each of the driving electrodes TX1, TX2 and TX3, and detects a change in coupling capacitance between each of the driving electrodes TX1, TX2 and TX3 and each of the sensing electrodes RX1, RX2; compares the change in the coupling capacitance with the predetermined threshold value. If the change in the coupling capacitance is greater than or equal to the predetermined threshold value, the control unit determines that the touch panel is touched; then the control unit determines that the sensing electrode RX1 is the one sensing electrode corresponding to the touch position according to the change in the coupling capacitance. Then, the control unit reuses the sensing electrode RX1 corresponding to the touch position to additionally function as a generated driving electrode TX4 and reuses the driving electrodes TX1, TX2 and TX3 to additionally function as generated sensing electrodes RX3, RX4, and RX5, respectively; next, the control unit drives, preferably simultaneously drives each of the at least one generated driving electrode which is/are reused (multiplexed) sensing electrodes (the generated driving electrode TX4 in the embodiment), and compares the change in the coupling capacitance with the predetermined threshold value of coupling capacitance variation, and if the change in the coupling capacitance is greater than or equal to the predetermined threshold value of coupling capacitance variation, determines that the touch panel is touched; then the control unit determines at least one driving electrode corresponding to the touch position according to the change in the coupling capacitance. In the embodiment, assume that the touch panel is touched, the change in coupling capacitance between the generated driving electrode TX4 and each of the generated sensing electrodes RX3, RX4, and RX5 is detected, and the driving electrodes TX1 and TX2 which are reused (multiplexed) and additionally function as the generated sensing electrodes RX3 and RX4 are determined as the driving electrodes corresponding to the touch position.

Finally, the control unit drives, preferably sequentially drives, the driving electrodes TX1 and TX2 corresponding to the touch position, and detects the change in coupling capacitance between each of the driving electrodes TX1 and TX2 corresponding to the touch position and the sensing electrode RX1 corresponding to the touch position; then compares the change in the coupling capacitance with the predetermined threshold value of coupling capacitance variation, and if the change in the coupling capacitance is greater than or equal to the predetermined threshold value of coupling capacitance variation, determines that the touch panel is touched; and then determines a driving electrode corresponding to the touch position and a sensing electrode corresponding to the touch position according to the variations of the coupling capacitance, to determine the position of the touch point, for example in the present embodiment, determine whether the touch occurs at the position corresponding to the driving electrode TX1 or the driving electrode TX2.

With comparison with the prior art where all driving electrodes are driven and all sensing electrodes are detected to determine a position of a touch point, the touch panel provided by an embodiment of the present disclosure is advantageous, because the embodiment of the present disclosure reduces the number of the driven driving electrodes and the number of the detected sensing electrodes by means of determining the sensing electrodes corresponding to the touch position and the driving electrodes corresponding to the touch position, so that the amount of data to be processed for positioning the touch point is reduced, thereby improving the efficiency of positioning the touch point. In addition, the driving electrodes are driven sequentially in the prior art, however, in an embodiment of the present disclosure, all of the driving electrodes can be driven simultaneously, thereby shortening the time for driving the driving electrodes.

Furthermore, in the prior art that, since driving lines for driving the driving electrodes and sensing lines for receiving sense signals are always in working status in positioning a touch point on the touch panel, there is interference between the driving lines and the sensing lines, thereby generating significant noise. With reference to FIG. 3 to FIGS. 4A and 4B, in order to solve such problem, in an embodiment of the present disclosure, while determining that the driving electrodes TX1 and TX2 are those corresponding to the touch position, the control unit 45 may ground sensing electrodes (such as the sensing electrode RX2) other than the at least one sensing electrode RX1 corresponding to touch position, so that sensing lines connected with the sensing electrodes (such as the sensing electrode RX2) other than the at least one sensing electrode RX1 corresponding to the touch position stop sending driving signals to any sensing electrodes other than the sensing electrodes which may be reused (multiplexed) and additionally function as the generated driving electrodes; meanwhile, driving lines connected with driving electrodes (such as the driving electrode TX3) other than the reused (multiplexed) driving electrodes TX1 and TX2 corresponding to the touch position also stop receiving sense signals from driving electrodes other than the driving electrodes which may be reused (multiplexed) and additionally function as the generated sensing electrodes. In addition, while determining the at least one driving electrode corresponding to the touch position and the at least one sensing electrode corresponding to the touch position, the control unit 45 may ground driving electrodes other than the driving electrodes corresponding to the touch position and sensing electrodes other than the sensing electrodes corresponding to the touch position, so that the driving lines not transmitting the touch signals stop sending the driving signals to driving electrodes not corresponding to the touch position, and the sensing lines not transmitting the touch signals also stop receiving touch signals from sensing electrodes not corresponding to the touch position, thereby avoiding the interference between the corresponding driving lines and the sensing lines and reducing noise.

Obviously, it is appreciated by those skilled in the art that the each of above modules or steps of the disclosure can be realized in general computing devices. These modules or steps can be concentrated on single computing device or distributed on a network composed of a plurality of computing devices. Preferably, these modules or steps can be implemented by program codes, which are executed by a computer device, thus they can be stored in a storage device and executed by a computing device. Or these modules or steps can be realized by manufacturing them into each of the integrated circuit module respectively or a plurality of modules or steps of them into single integrated circuit module. As such, the disclosure is not limited to any specific combination of hardware and software.

The embodiments of the present disclosure have been described above, but are not intended to limit the present disclosure. Various modifications and changes of the present disclosure can be made by those skilled in the art. Any modifications, equivalent substitutions, improvement, etc., made within the spirits and principles of the disclosure, should fall into the scope of protection of the present invention.

What is claimed is:

1. A touch detecting method for a touch panel, wherein the touch panel comprises a plurality of driving electrodes and a plurality of sensing electrodes, the touch detecting method comprising:

driving the plurality of driving electrodes simultaneously, and detecting a first change in a coupling capacitance between one said driving electrode and one said sensing electrode, wherein the first change is used to determine a first-type of sensing electrodes associated with a touch position and a second-type of sensing electrodes not associated with a touch position;

multiplexing the first-type of sensing electrodes associated with the touch position to be generated driving electrodes, and multiplexing each of the plurality of driving electrodes to be a generated sensing electrode, wherein the second-type of sensing electrodes not associated with the touch position are not multiplexed to be generated driving electrodes, wherein a number of the generated driving electrodes is smaller than a number of the generated sensing electrodes;

driving all the generated driving electrodes simultaneously, and detecting a second change in the coupling capacitance between each pair of one said generated driving electrode and one said generated sensing electrode to determine a first-type of drive electrodes associated with the touch position and a second-type of drive electrodes not associated with the touch position; and sequentially driving the first-type of driving electrodes associated with the touch position, and detecting a third change in coupling capacitance between each pair of one said first-type of driving electrodes and one said first-type of sensing electrodes to determine the touch position, wherein a number of the first-type of driving electrodes is smaller than a number of the plurality of driving electrodes, and wherein a number of the first-type of sensing electrodes is smaller than a number of the plurality of sensing electrodes.

2. The touch detecting method of claim 1, wherein detecting the first change in the coupling capacitance between each pair of one said driving electrode and one said sensing electrode comprises:

comparing the first change in the coupling capacitance with a predetermined threshold value, wherein when the first change in the coupling capacitance is greater than or equal to the predetermined threshold value, decide that the touch panel is touched; and determining the first-type of sensing electrodes associated with the touch position and the second-type of sensing electrodes not associated with the touch position according to the first change of the coupling capacitance.

3. The touch detecting method of claim 1, wherein detecting the second change in the coupling capacitance between one said generated driving electrode and one said generated sensing electrode comprises:

comparing the second change in the coupling capacitance with a predetermined threshold value, wherein when the second change in the coupling capacitance is greater than or equal to the predetermined threshold value, decide that the touch panel is touched; and determining the first-type of driving electrodes associated with the touch position and the second-type of driving electrodes not associated with the touch position according to the second change in the coupling capacitance.

4. The touch detecting method of claim 1, wherein detecting the third change in coupling capacitance between each pair of one said first-type of driving electrode and one said first-type of sensing electrode comprises:

comparing the third change in the coupling capacitance with a predetermined threshold value, wherein when the third change in the coupling capacitance is greater than or equal to the predetermined threshold value, decide that the touch panel is touched; and determining the touch position from the first-type of driving electrodes associated with the touch position and the first-type of sensing electrodes associated with the touch position contributing to the third change.

5. The touch detecting method of claim 1, further comprising:

grounding all sensing electrodes except the first-type of sensing electrodes associated with the touch position.

6. The touch detecting method of claim 1, further comprising:

grounding all driving electrodes except for the first-type of driving electrodes associated with the touch position; and grounding all sensing electrodes except for the first-type of sensing electrodes associated with the touch position.

7. A touch panel comprising a plurality of driving electrodes, a plurality of sensing electrodes, a plurality of driving lines connected with the plurality of driving electrodes, and a plurality of sensing lines connected with the plurality of sensing electrodes, the touch panel comprises:

a control unit comprising an integrated circuitry (IC) being electrically connected with all of the driving lines and all of the sensing lines;

wherein the driving lines are configured to respectively drive the driving electrodes, and the sensing lines are configured to respectively receive sense signals from the sensing electrodes;

wherein the control unit is configured to:

drive the plurality of driving electrodes simultaneously, and detect a first change in a coupling capacitance between one said driving electrode and one said sensing electrode, wherein the first change is used to determine a first-type of sensing electrodes associated with a touch position and a second-type of sensing electrodes not associated with a touch position;

multiplex the first-type of sensing electrodes associated with the touch position to be generated driving electrodes, and multiplex each of the plurality of driving electrodes to be a generated sensing electrode, wherein the second-type of sensing electrodes not associated with the touch position are not multiplexed to be generated driving electrodes, wherein a number of the generated driving electrodes is smaller than a number of the generated sensing electrodes;

drive all the generated driving electrodes simultaneously, and detect a second change in the coupling capacitance between each pair of one said generated driving electrode and each of the one said generated sensing electrode to determine a first-type of drive electrodes associated with the touch position and a second-type of driving electrodes not associated with the touch position; and sequentially drive the first-type of driving electrodes associated with the touching position, and detect a third change in coupling capacitance between each pair of one said first-type of driving electrode and one said first-type of sensing electrode to determine the touch position, wherein a number of the first-type of driving electrodes is smaller than a number of the plurality of driving electrodes, and wherein a number of the first-type of sensing electrodes is smaller than a number of the plurality of sensing electrodes.

8. The touch panel of claim 7, wherein the control unit is further configured to:

drive the plurality of driving electrodes simultaneously, and detect the first change in the coupling capacitance between each pair of one said driving electrode and one said sensing electrode;

compare the first change in the coupling capacitance with a predetermined threshold value, wherein when the change in the coupling capacitance is greater than or equal to the predetermined threshold value, decide that the touch panel is touched; and determine the first-type of sensing electrodes associated with the touch position and second-type of sensing electrodes not associated with the touch position according to the first change of the coupling capacitance.

9. The touch panel of claim 7, wherein the control unit is further configured to:

drive all the generated driving electrodes simultaneously, and detect the second change in the coupling capacitance between each pair of one said generated driving electrode and one said generated sensing electrode to determine the touch position;

compare the second change in the coupling capacitance with a predetermined threshold value of coupling capacitance variation, wherein when the second change in the coupling capacitance is greater than or equal to the predetermined threshold value, decide that the touch panel is touched; and determine the first-type of driving electrodes associated with the touch position and the second-type of driving electrodes not associated with the touch position according to the second change in the coupling capacitance.

10. The touch panel of claim 7, wherein the control unit is further configured to:

drive the first-type of driving electrodes associated with the touch position sequentially, and detect the third change in coupling capacitance between each pair of one said first-type of driving electrode associated with the touch position one said first-type of sensing electrode associated with the touch position;

compare the third change in the coupling capacitance with a predetermined threshold value of coupling capacitance variation, wherein when the third change in the coupling capacitance is greater than or equal to the predetermined threshold value of coupling capacitance variation, decide that the touch panel is touched; and determine the touch position from the first-type of driving electrodes associated with the touch position and the first-type of sensing electrodes associated with the touch position contributing to the third change.

11. The touch panel of claim 7, wherein the control unit is further configured to:

ground all sensing electrodes except for the first-type of sensing electrodes associated with the touch position, while determining the first-type of driving electrodes associated with the touch position.

12. The touch panel of claim 7, wherein the control unit is further configured to:

ground all driving electrodes except for the first-type of driving electrodes associated with the touch position and ground all sensing electrodes except for the first-type of sensing electrodes associated with the touch position, while determining the first-type of driving electrodes associated with the touch position and the first-type of sensing electrodes associated with the touch position.

* * * * *